(12) United States Patent
Yoshida et al.

(10) Patent No.: US 8,102,434 B2
(45) Date of Patent: Jan. 24, 2012

(54) IMAGING APPARATUS, IMAGING METHOD, AND PROGRAM

(75) Inventors: Tsuyoshi Yoshida, Tokyo (JP);
Nobuyuki Sato, Tokyo (JP); Ken Nakajima, Tokyo (JP)

(73) Assignee: Sony Corporation, Tokyo (JP)

( * ) Notice: Subject to any disclaimer, the term of this patent is extended or adjusted under 35 U.S.C. 154(b) by 618 days.

(21) Appl. No.: 11/556,304

(22) Filed: Nov. 3, 2006

(65) Prior Publication Data
US 2007/0115367 A1 May 24, 2007

(30) Foreign Application Priority Data

Nov. 24, 2005 (JP) .................................. 2005-338929

(51) Int. Cl.
*H04N 5/225* (2006.01)
*H04N 5/00* (2011.01)
(52) U.S. Cl. ..................................... 348/220.1; 386/120
(58) Field of Classification Search ............... 348/220.1, 348/231.2, 233.02, 262, 343, 471–472; 386/117, 386/118, 120, 121
See application file for complete search history.

(56) References Cited

U.S. PATENT DOCUMENTS

| | | | | |
|---|---|---|---|---|
| 4,819,059 A | * | 4/1989 | Pape | 348/220.1 |
| 6,034,728 A | * | 3/2000 | Arena | 348/372 |
| 6,400,891 B1 | * | 6/2002 | Noda et al. | 386/120 |
| 6,667,765 B1 | * | 12/2003 | Tanaka | 348/229.1 |
| 6,871,010 B1 | * | 3/2005 | Taguchi et al. | 386/230 |
| 6,961,083 B2 | * | 11/2005 | Obrador et al. | 386/120 |
| 6,970,191 B1 | * | 11/2005 | Sase et al. | 348/220.1 |
| 7,057,657 B1 | * | 6/2006 | Ishihara et al. | 348/312 |
| 7,145,601 B2 | * | 12/2006 | Misawa et al. | 40/446 |
| 7,369,683 B2 | * | 5/2008 | Kobayashi et al. | 382/107 |
| 7,417,667 B2 | * | 8/2008 | Shibutani | 348/220.1 |
| 7,456,896 B2 | * | 11/2008 | Nakashima et al. | 348/345 |
| 2003/0052986 A1 | * | 3/2003 | Matsumoto | 348/333.05 |

FOREIGN PATENT DOCUMENTS

| | | |
|---|---|---|
| JP | 2000-78486 | 3/2000 |
| JP | 2000-134550 | 5/2000 |
| JP | 2000-134550 A | * 12/2000 |
| JP | 2001-257946 | 9/2001 |
| JP | 2002-44531 | 2/2002 |
| JP | 2005-57378 | 3/2005 |
| JP | 2005-117114 | 4/2005 |

* cited by examiner

*Primary Examiner* — Trung Diep
(74) *Attorney, Agent, or Firm* — Oblon, Spivak, McClelland, Maier & Neustadt, L.L.P.

(57) ABSTRACT

An imaging apparatus capturing and recording a moving image and a static image at the same time includes a converter converting an optical image of a subject into a pixel signal, performing decimation on the pixel signal and outputting the pixel signal that has been subjected to decimation when recording of the moving image is performed but recording of the static image is not performed, and outputting the pixel signal that has not been subjected to decimation when recording of the moving image and the static image is performed; an eliminating section performing decimation on the pixel signal output from the converter only when recording of the moving image and the static image is performed; a moving image data generator generating moving image data; a static image data generator generating static image data; and a recorder recording the moving image data and the static image data.

5 Claims, 8 Drawing Sheets

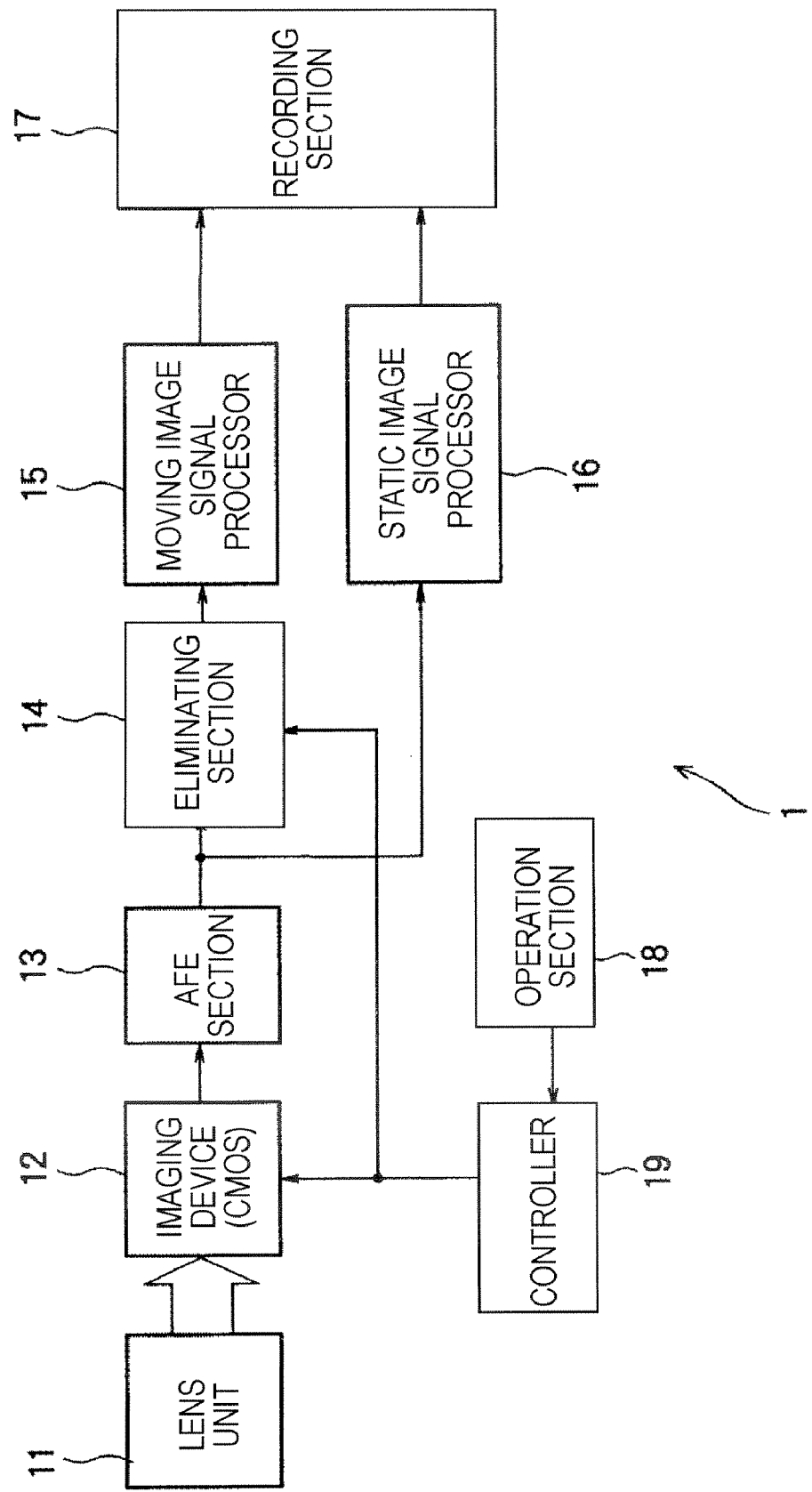

FIG. 2A

| R | Gr | R | Gr | R |
|---|----|---|----|---|
| Gb | B | Gb | B | Gb |
| R | Gr | R | Gr | R |
| Gb | B | Gb | B | Gb |
| R | Gr | R | Gr | R |

FIG. 2B

| R | Gr | R | Gr | R |
|---|----|---|----|---|
| Gb | B | Gb | B | Gb |
| R | Gr | R | Gr | R |
| Gb | B | Gb | B | Gb |
| R | Gr | R | Gr | R |

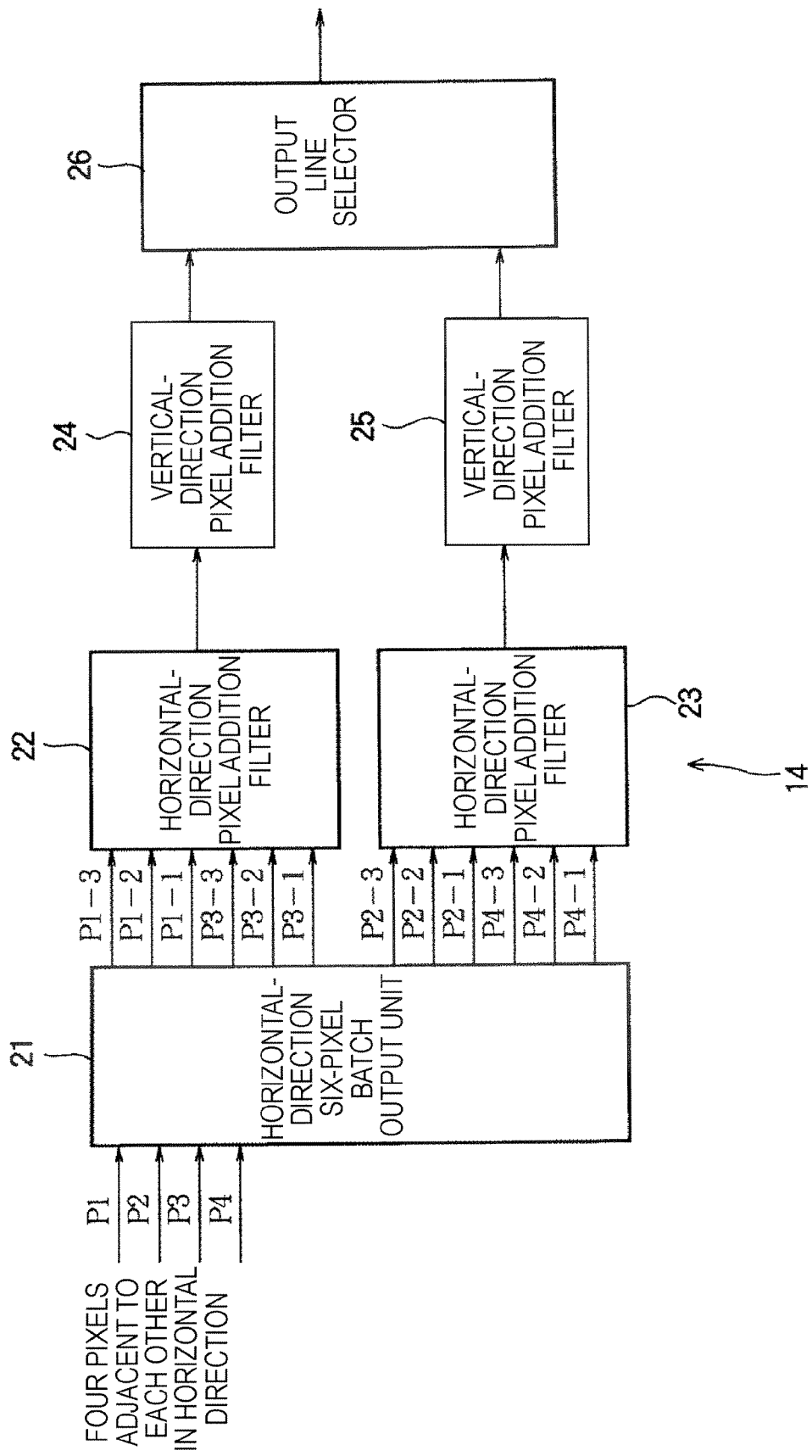

FIG. 4

| BATCH OUTPUT | | | BATCH OUTPUT | | | BATCH OUTPUT | | | |
|---|---|---|---|---|---|---|---|---|---|
| R P1-1 | Gr P2-1 | R P3-1 | Gr P4-1 | R P1-2 | Gr P2-2 | R P3-2 | Gr P4-2 | R P1-3 | Gr P2-3 | R P3-3 | Gr P4-3 |
| Gb | B | Gb | B | Gb | B | Gb | B | Gb | B | Gb | B |
| R | Gr | R | Gr | R | Gr | R | Gr | R | Gr | R | Gr |

IMAGING APPARATUS, IMAGING METHOD, AND PROGRAM

CROSS REFERENCES TO RELATED APPLICATIONS

The present invention contains subject matter related to Japanese Patent Application JP 2005-338929 filed in the Japanese Patent Office on Nov. 24, 2005, the entire contents of which are incorporated herein by reference.

BACKGROUND OF THE INVENTION

1. Field of the Invention

The present invention relates to imaging apparatuses, imaging methods, and programs, and more particularly, to an imaging apparatus, an imaging method, and a program that are capable of capturing moving images and static images at the same time.

2. Description of the Related Art

Digital still cameras and digital video cameras including imaging devices, such as charge-coupled devices (CCDs) or complementary metal-oxide semiconductors (CMOSs), have been widely used.

Digital still cameras capture static images. Digital video cameras capture moving images. Digital still cameras having a function to capture moving images and digital video cameras having a function to capture static images are also available. However, such digital still cameras and digital video cameras do not capture static images and moving images at the same time. Such digital still cameras and digital video cameras are only capable of selectively capturing static images and moving images.

For example, when a known digital video camera capable of recording static images is instructed to record a static image during recording of a moving image, the known digital video camera temporarily stops an operation for recording the moving image, records the static image, and resumes the recording of the moving image. However, the use of such a digital video camera damages the continuity of moving images.

In such circumstances, various methods for capturing static images and moving images at the same time have been suggested (see, for example, Japanese Unexamined Patent Application Publication No. 2002-44531).

SUMMARY OF THE INVENTION

As a method for recording a static image during recording of a moving image, for example, a method for extracting image data for one frame from a moving image to be recorded and for recording the extracted image data as a static image has been suggested. In this method, only a pixel signal to be recorded as a moving image is output from an imaging device. Since a static image to be recorded has been subjected to processing for moving images, such a static image may not sufficiently satisfy an image quality necessary for static images. For example, the size of an image frame is changed to be appropriate for recording of moving images, the bandwidth of a color signal is restricted (that is, the amount of information is reduced), or the like.

In addition, for example, a method is also available in which all the pixels are always output from an imaging device, in which pixel decimation is performed in order to reduce the size of an image frame so as to be appropriate for recording of moving images when recording as a moving image is performed, and in which, the size of an image frame when the pixels are output from the imaging device is used without pixel decimation when a static image is recorded. In this method, since all the pixels are always output from the imaging device, the power consumption of the imaging device increases. Since normal imaging apparatuses use a battery as a power supply, it is desirable to consume as small amount of power as possible.

In addition, for example, a method in which an imaging device for capturing moving images and an imaging device for capturing static images are provided is also considered. In this method, a plurality of imaging devices is necessary. Thus, this causes increases in the size, the cost, and the power consumption of an apparatus.

It is desirable to perform recording of moving images and recording of static images at the same time while a reduction in image quality and an increase in power consumption are suppressed.

An imaging apparatus according to an embodiment of the present invention that captures and records a moving image and a static image at the same time includes converting means for converting an optical image of a subject into a pixel signal, for performing decimation on the pixel signal and outputting to a subsequent stage the pixel signal that has been subjected to decimation when recording of the moving image is performed but recording of the static image is not performed, and for outputting to the subsequent stage the pixel signal that has not been subjected to decimation when recording of the moving image and the static image is performed; eliminating means for performing decimation on the pixel signal output from the converting means only when recording of the moving image and the static image is performed; moving image data generating means for generating moving image data in accordance with the pixel signal that has been subjected to decimation by the converting means or the eliminating means; static image data generating means for generating static image data in accordance with the pixel signal that has not been subjected to decimation output from the converting means; and recording means for recording the generated moving image data and the generated static image data.

The eliminating means may perform decimation, which is similar to the decimation performed by the converting means when recording of the moving image is performed but recording of the static image is not performed, on the pixel signal output from the converting means only when recording of the moving image and the static image is performed.

The converting means may include a complementary metal-oxide semiconductor sensor.

An imaging method according to an embodiment of the present invention for use in an imaging apparatus that captures and records a moving image and a static image at the same time includes the steps of, when recording of the moving image is performed but recording of the static image is not performed, converting an optical image of a subject into a pixel signal, performing decimation on the pixel signal, and outputting to a subsequent stage the pixel signal that has been subjected to decimation; generating moving image data in accordance with the pixel signal that has been subjected to decimation; and recording the generated moving image data, and when recording of the moving image and the static image is performed, converting an optical image of a subject into a pixel signal and outputting to the subsequent stage the pixel signal that has not been subjected to decimation; generating static image data in accordance with the pixel signal that has not been subjected to decimation; recording the generated static image data; performing decimation on the pixel signal that has not been subjected to decimation; generating moving image data in accordance with the pixel signal that has been subjected to decimation; and recording the generated moving image data A program according to an embodiment of the present invention is used for capturing and recording a moving image and a static image at the same time and causes a computer to perform processing including the steps of, when recording of the moving image is performed but recording of the static image is not performed, converting an optical image of a subject into a pixel signal, performing decimation on the pixel signal, and outputting to a subsequent stage the pixel signal that has been subjected to decimation; generating moving image data in accordance with the pixel signal that has been subjected to decimation; and recording the generated moving image data, and when recording of the moving image and the static image is performed, converting an optical image of a subject into a pixel signal and outputting to the subsequent stage the pixel signal that has not been subjected to decimation; generating static image data in accordance with the pixel signal that has not been subjected to decimation; recording the generated static image data; performing decimation on the pixel signal that has not been subjected to decimation; generating moving image data in accordance with the pixel signal that has been subjected to decimation; and recording the generated moving image data.

Thus, recording of a moving image and recording of a static image can be performed at the same time while a reduction in image quality and an increase in power consumption are suppressed.

BRIEF DESCRIPTION OF THE DRAWINGS

FIG. 1 is a block diagram showing an example of the configuration of a digital camera according to an embodiment of the present invention;

FIGS. 2A and 2B show an example of the arrangement of a color filter covering an imaging device shown in FIG. 1;

FIG. 3 is a block diagram showing an example of the configuration of an eliminating section shown in FIG. 1;

FIG. 4 shows an example of the arrangement of pixels;

DESCRIPTION OF THE PREFERRED EMBODIMENTS

Figure 5:
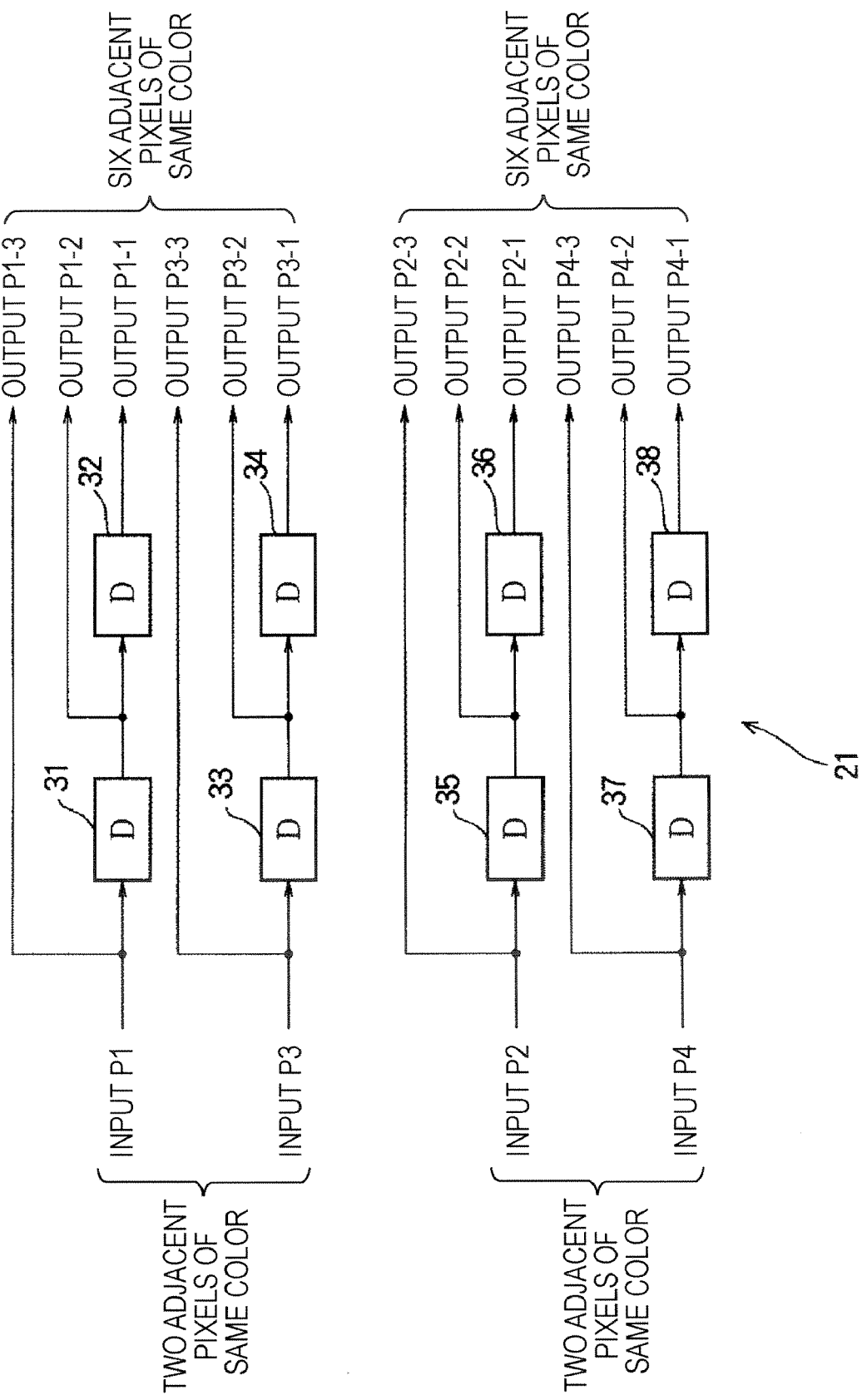
FIG. 5 is a block diagram showing an example of the configuration of a horizontal-direction six-pixel batch output unit shown in FIG. 3.

Before describing preferred embodiments of the present invention, the correspondence between the features of the present invention and embodiments described in the specification or the drawings will be discussed below. This description is intended to assure that embodiments supporting the present invention are described in the specification or the drawings. Thus, even if an embodiment described in the specification or the drawings is not described here as relating to an embodiment corresponding to a feature of the present invention, this does not mean that the embodiment does not relate to that feature of the present invention. In contrast, even if an embodiment is described here as relating to a feature of the present invention, this does not mean that the embodiment does not relate to other features of the present invention.

An imaging apparatus (for example, a digital camera 1 shown in FIG. 1) according to an embodiment of the present invention that captures and records a moving image and a static image at the same time includes converting means (for example, an imaging device 12 shown in FIG. 1) for converting an optical image of a subject into a pixel signal, for performing decimation on the pixel signal and outputting to a subsequent stage the pixel signal that has been subjected to decimation when recording of the moving image is performed but recording of the static image is not performed, and for outputting to the subsequent stage the pixel signal that has not been subjected to decimation when recording of the moving image and the static image is performed; eliminating means (for example, an eliminating section 14 shown in FIG. 1) for performing decimation on the pixel signal output from the converting means only when recording of the moving image and the static image is performed; moving image data generating means (for example, a moving image signal processor 15 shown in FIG. 1) for generating moving image data in accordance with the pixel signal that has been subjected to decimation by the converting means or the eliminating means; static image data generating means (for example, a static image signal processor 16 shown in FIG. 1) for generating static image data in accordance with the pixel signal that has not been subjected to decimation output from the converting means; and recording means (for example, a recording section 17 shown in FIG. 1) for recording the generated moving image data and the generated static image data.

Figure 8:
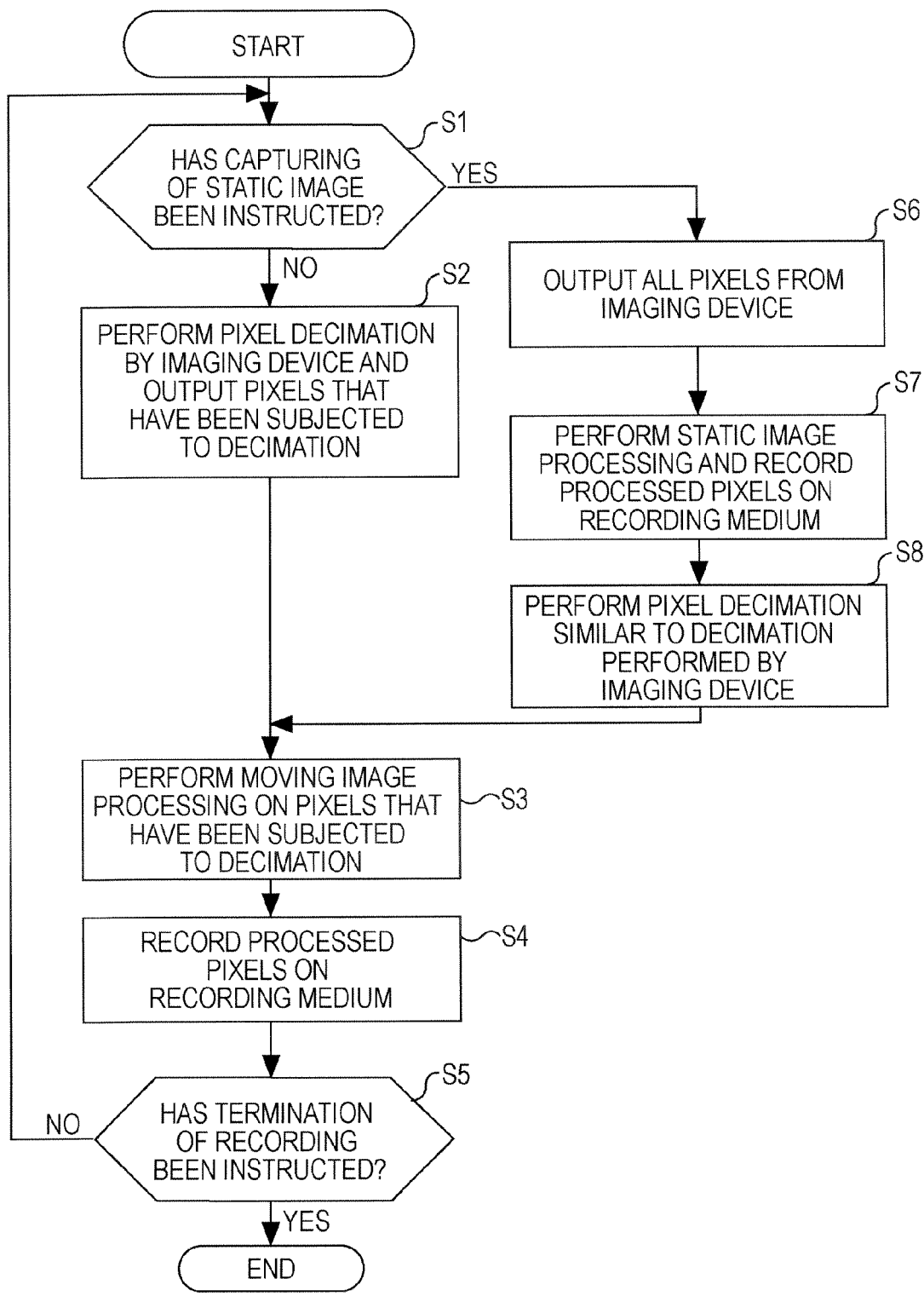
FIG. 8 is a flowchart of a recording process performed by the digital camera according to the embodiment of the present invention.

An imaging method according to an embodiment of the present invention for use in an imaging apparatus that captures and records a moving image and a static image at the same time includes the steps of, when recording of the moving image is performed but recording of the static image is not performed, converting an optical image of a subject into a pixel signal, performing decimation on the pixel signal, and outputting to a subsequent stage the pixel signal that has been subjected to decimation (for example, step S2 of FIG. 8); generating moving image data in accordance with the pixel signal that has been subjected to decimation (for example, step S3 of FIG. 8); and recording the generated moving image data (for example, step S4 of FIG. 8), and when recording of the moving image and the static image is performed, converting an optical image of a subject into a pixel signal and outputting to the subsequent stage the pixel signal that has not been subjected to decimation (for example, step S6 of FIG. 8); generating static image data in accordance with the pixel signal that has not been subjected to decimation; recording the generated static image data (for example, step S7 of FIG. 8); performing decimation on the pixel signal that has not been subjected to decimation (for example, step S8 of FIG. 8); generating moving image data in accordance with the pixel signal that has been subjected to decimation (for example, step S3 of FIG. 8); and recording the generated moving image data (for example, step S4 of FIG. 8).

A program according to an embodiment of the present invention is used for capturing and recording a moving image and a static image at the same time and causes a computer to perform processing including the steps of, when recording of the moving image is performed but recording of the static image is not performed, converting an optical image of a subject into a pixel signal, performing decimation on the pixel signal, and outputting to a subsequent stage the pixel signal that has been subjected to decimation (for example, step S2 of FIG. 8); generating moving image data in accordance with the pixel signal that has been subjected to decimation (for example, step S3 of FIG. 8); and recording the generated moving image data (for example, step S4 of FIG. 8), and when recording of the moving image and the static image is performed, converting an optical image of a subject into a pixel signal and outputting to the subsequent stage the pixel signal that has not been subjected to decimation (for example, step S6 of FIG. 8); generating static image data in accordance with the pixel signal that has not been subjected to decimation; recording the generated static image data (for example, step S7 of FIG. 8); performing decimation on the pixel signal that has not been subjected to decimation (for example, step S8 of FIG. 8); generating moving image data in accordance with the pixel signal that has been subjected to decimation (for example, step S3 of FIG. 8); and recording the generated moving image data (for example, step S4 of FIG. 8).

Embodiments of the present invention will be described with reference to the drawings.

FIG. 1 shows an example of the configuration of a digital camera 1 according to an embodiment of the present invention. The digital camera 1 is capable of capturing a static image without interrupting capturing of a moving image. In the descriptions given below, a state in which only a moving image is captured is referred to as a "moving image capturing state", and a state in which a static image is captured while a moving image is captured is referred to as a "static image capturing state".

The digital camera 1 includes a lens unit 11 and an imaging device (CMOS) 12. The lens unit 11 converges an optical image of a subject onto the imaging device 12. The imaging device 12 converts the converged optical image into electric signals (pixels). In the moving image capturing state, the imaging device 12 performs pixel decimation and outputs to the subsequent stage the pixels that have been subjected to decimation. In the static image capturing state, the imaging device 12 outputs to the subsequent stage the pixels without pixel decimation. The digital camera 1 also includes an analog front end (AFE) section 13 that converts pixels of analog signals output from the imaging device 12 into digital signals, an eliminating section 14 that performs pixel decimation of an output of the AFE section 13, a moving image signal processor 15 that generates moving image data in accordance with pixels received from the eliminating section 14, a static image signal processor 16 that generates static image data in accordance with pixels received from the AFE section 13, and a recording section 17 that records moving image data and static image data on a recording medium (not shown). The digital camera 1 also includes an operation section 18 that receives a user operation and a controller 19 that generally controls the digital camera 1.

The imaging device 12 includes a CMOS sensor. For example, the light-receiving surface of the imaging device 12 is covered with a color filter having a primary color Bayer pattern shown in FIG. 2A. FIGS. 2A and 2B show a region of 5×5 pixels of the color filter. In FIGS. 2A and 2B, "R" represents red, "B" represents blue, "Gr" represents green in a red line, and "Gb" represents green in a blue line.

The CMOS constituting the imaging device 12 is capable of simultaneously outputting four pixels that are adjacent to each other in a horizontal direction. Thus, for example, based on a pixel "R" located at the upper left of FIG. 2A, four pixels, R, Gr, R, and Gr, are output simultaneously. When the read timing of the imaging device 12 is 108 megahertz, 7.2 (=108× 4/60) megapixels can be read at one frame period (1/60 seconds). Thus, when the total number of pixels of the imaging device 12 is $7.2 \times 10^6$ or less, all the pixels can be read at each frame period.

The imaging device 12 performs decimation only in the moving image capturing state. Such decimation is achieved, for example, by adding nine pixels shown by oblique lines in FIG. 2B together to generate one pixel. Thus, the size of the original image frame is reduced vertically and horizontally. In this example, the size of the original image frame is reduced to one-third vertically and horizontally. A decimation method and the ratio of reduction are not limited to the above-mentioned example.

The AFE section 13 performs sample-hold processing for sampling pixels output from the imaging device 12, automatic gain control (AGC) for adjusting the gain of the sampled pixels, and analog-to-digital (A/D) conversion for digitizing the pixels that have been subjected to AGC.

The eliminating section 14 performs decimation on pixels that have not been subjected to decimation received from the AFE section 13 in the static image capturing state, and outputs to the moving image signal processor 15 the pixels that have been subjected to decimation. This decimation performed by the eliminating section 14 is similar to the decimation performed by the imaging device 12 in the moving image capturing state. In contrast, the pixels that have been subjected to decimation received from the AFE section 13 in the moving image capturing state are output to the moving image signal processor 15 without being subjected to processing of the eliminating section 14. An example of the configuration of the eliminating section 14 will be described later with reference to FIGS. 3 to 6.

In the moving image capturing state and the static image capturing state, the moving image signal processor 15 generates moving image data in accordance with pixels that have been subjected to decimation received from the eliminating section 14, and outputs the generated moving image data to the recording section 17. The static image signal processor 16 generates static image data in accordance with pixels that have not been subjected to decimation output from the AFE section 13 only in the static image capturing state, and outputs the generated static image data to the recording section 17.

The operation section 18 includes a switch, a button, and the like provided on the casing of the digital camera 1. The operation section 18 receives user operations for instructing start or termination of capturing of moving images, timing of capturing of static images (shutter timing), and the like. The operation section 18 outputs a corresponding operation signal to the controller 19. The controller 19 generally controls the digital camera 1 in accordance with an operation signal received from the operation section 18. In particular, the controller 19 controls whether or not to cause the imaging device 12 to perform decimation or whether or not to cause the eliminating section 14 to perform decimation.

FIG. 3 shows an example of the configuration of the eliminating section 14. The eliminating section 14 includes a horizontal-direction six-pixel batch output unit 21 that outputs six pixels of the same color disposed in the same horizontal line for two colors, horizontal-direction pixel addition filters 22 and 23 that add, in the order of disposition of pixels, three pixels out of six pixels of the same color disposed in the same horizontal color, vertical-direction pixel addition filters 24 and 25 that add, in a vertical direction, calculation results of the horizontal-direction pixel addition filters 22 and 23 for a predetermined number of lines, and an output line selector 26 that outputs calculation results of the vertical-direction pixel addition filters 24 and 25 to the subsequent stage at a predetermined point in time.

The horizontal-direction six-pixel batch output unit 21 adjusts an output timing of four pixels, P1, P2, P3, and P4, that are adjacent to each other in the horizontal direction simultaneously input from the AFE section 13, and outputs six pixels of the same color disposed in the same horizontal line to the horizontal-direction pixel addition filter 22 or 23. For example, four pixels, P1-1, P2-1, P3-1, and P4-1, that are adjacent to each other in the horizontal direction are simultaneously input from the AFE section 13 at a predetermined point in time, as shown in FIG. 4. At the next point in time, four pixels, P1-2, P2-2, P3-2, and P4-2, are simultaneously output from the AFE section 13, and the next point in time, four pixels P1-3, P2-3, P3-3, and P4-3, are simultaneously output from the AFE section 13.

The horizontal-direction six-pixel batch output unit 21 includes eight delay (D) portions 31 to 38, as shown in FIG. 5. The horizontal-direction six-pixel batch output unit 21 delays received pixels by at most two clocks, and outputs to the horizontal-direction pixel addition filter 22 or 23 six pixels of the same color disposed in the same horizontal line. For example, six R pixels, P1-1, P3-1, P1-2, P3-2, P1-3, and P3-3, out of pixels on the upper case shown in FIG. 4 are simultaneously output to the horizontal-direction pixel addition filter 22. In addition, six Gr pixels, P2-1, P4-1, P2-2, P4-2, P2-3, and P4-3, are simultaneously output to the horizontal-direction pixel addition filter 23.

Figure 6:
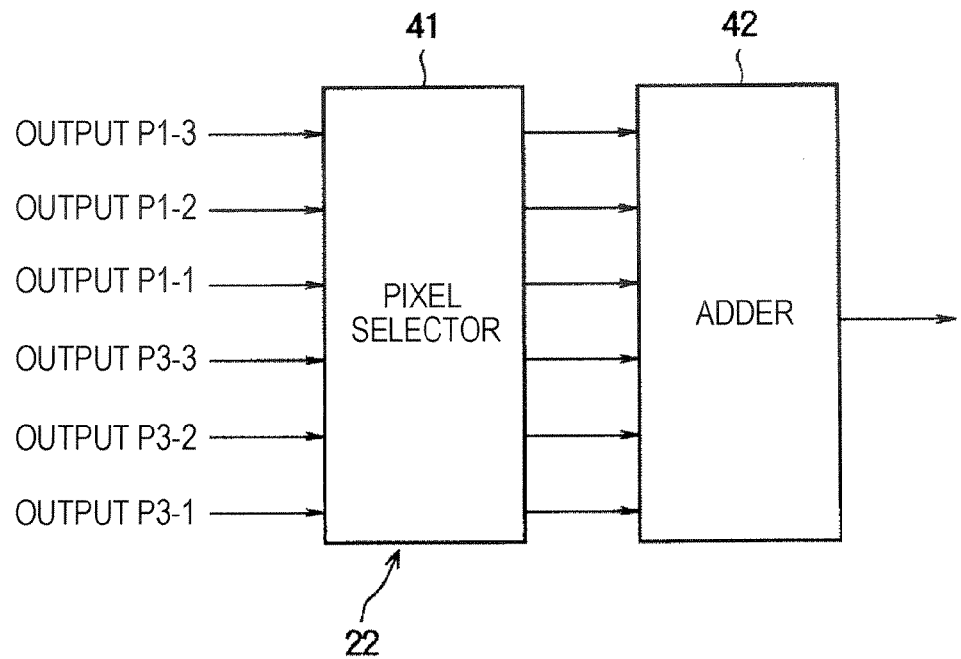
FIG. 6 is a block diagram showing an example of the configuration of a horizontal-direction pixel addition filter shown in FIG. 3.

As shown in FIG. 6, the horizontal-direction pixel addition filter 22 includes a pixel selector 41 that selects, in a desired manner, six pixels of the same color received from the previous stage and an adder 42 that adds pixels selected by the pixel selector 41. The decimation rate in the horizontal direction and the phase after addition can be set in a desired manner by changing pixels to be selected in the pixel selector 41. Since the configuration of the horizontal-direction pixel addition filter 23 is similar to the configuration of the horizontal-direction pixel addition filter 22, the explanation of the configuration of the horizontal-direction pixel addition filter 23 will be omitted.

Figure 7:
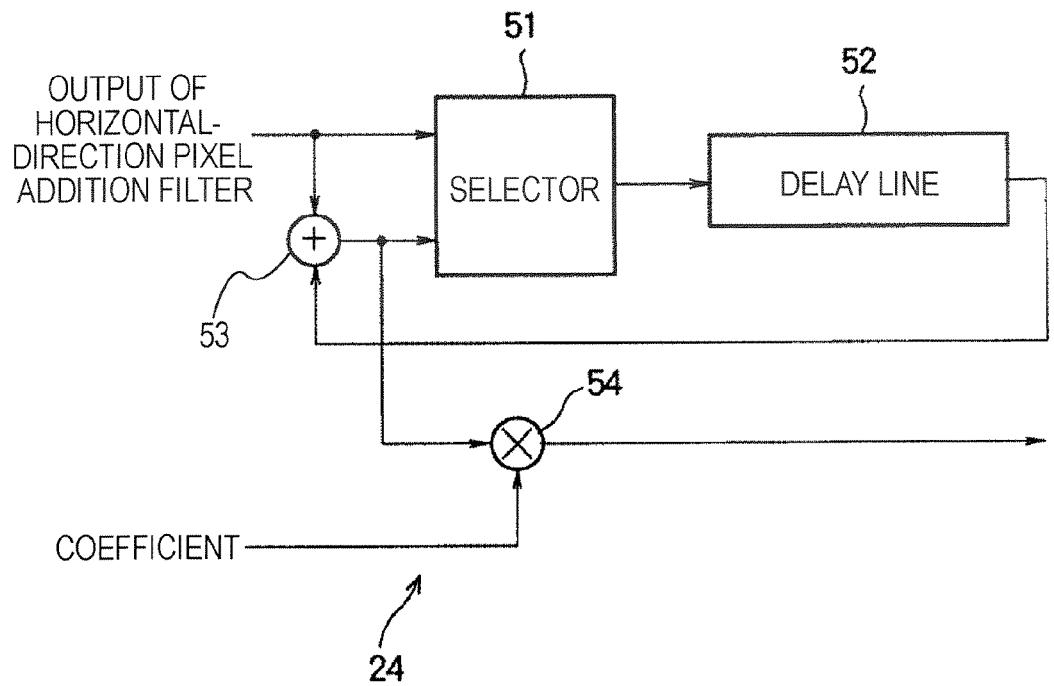
FIG. 7 is a block diagram showing an example of the configuration of a vertical-direction pixel addition filter shown in FIG. 3.

As shown in FIG. 7, the vertical-direction pixel addition filter 24 includes a selector 51 that supplies an output of the horizontal-direction pixel addition filter 22 or an output of an adder 53 to the subsequent stage, a delay line 52 that holds an output of the selector 51, the adder 53 that adds an output of the horizontal-direction pixel addition filter 22 and the value held at the delay line 52 together, and a multiplier 54 that multiplies an output of the adder 53 by a predetermined coefficient.

In the vertical-direction pixel addition filter 24, pixels added in the horizontal direction that are output from the horizontal-direction pixel addition filter 22 are delayed by the delay line 52, and the delayed pixels are added to pixels added in another line whose position in the horizontal direction is equal to that of the delayed pixels. The number of vertical lines to be added together can be changed in a desired manner. With this change, the decimation rate in the vertical direction and the phase after addition can be set in a desired manner. The coefficient by which an added value in the vertical direction is multiplied is based on the total number of pixels added in the horizontal and vertical directions, and a value determined such that the signal level is equal to that of an output of the imaging device 12 is used. Since the configuration of the vertical-direction pixel addition filter 25 is similar to the configuration of the vertical-direction pixel addition filter 24, the explanation of the configuration of the vertical-direction pixel addition filter 25 will be omitted.

A recording process performed by the digital camera 1 will now be described with reference to the flowchart of FIG. 8.

The recording process starts when a user instructs the operation section 18 to start capturing (or recording) of a moving image.

In step S1, the controller 19 controls whether or not the user has instructed the operation section 18 to capture a static image. When it is determined in step S1 that capturing of a static image has not been instructed, the process proceeds to step S2.

In step S2, the imaging device 12 performs pixel decimation, under the control of the controller 19, to achieve a size of an image frame appropriate for a moving image, and outputs pixels that have been subjected to decimation to the subsequent stage. Then, the pixels that have been subjected to decimation are converted into digital signals by the AFE section 13, and are supplied to the moving image signal processor 15 without being subjected to processing of the eliminating section 14.

In step S3, the moving image signal processor 15 generates moving image data in accordance with the pixels that have been subjected to decimation, and outputs the generated moving image data to the recording section 17. In step S4, the recording section 17 records on the recording medium the moving image data received from the moving image signal processor 15.

In step S5, the controller 19 determines whether or not the user has instructed the operation section 18 to terminate capturing (or recording) of the moving image. If it is determined in step S5 that termination of recording has not been instructed, the process returns to step S1. Then, the subsequent processing is repeated. That is, recording of moving image data is continued.

In contrast, if it is determined in step S1 that capturing of a static image has been instructed, the process proceeds to step S6.

In step S6, the imaging device 12 outputs to the subsequent stage all the pixels without decimation under the control of the controller 19. Then, the pixels that have not been subjected to decimation are converted into digital signals by the AFE section 13, and are supplied to the eliminating section 14 and the static image signal processor 16.

The static image signal processor 16, to which the pixels that have not been subjected to decimation are supplied, generates static image data in accordance with the pixels that have not been subjected to decimation, and outputs the generated static image data to the recording section 17. The recording section 17 records on the recording medium the static image data received from the static image signal processor 16.

In step S8, the eliminating section 14 performs decimation, which is similar to the decimation performed by the imaging device 12 in step S2, on the pixels that have not been subjected to decimation received from the previous stage. Then, the eliminating section 14 supplies the pixels that have been subjected to decimation to the moving image signal processor 15.

In actuality, the processing of step S7 and the processing of step S8 are simultaneously performed in parallel to each other.

Then, the process proceeds to step S3, and the subsequent processing is repeated. That is, moving image data is generated in accordance with the pixels that have been subjected to decimation, and the generated moving image data is recorded on the recording medium. If it is determined in step S5 that termination of recording has been instructed, the operation of each section is stopped to terminate recording.

Figure 9:
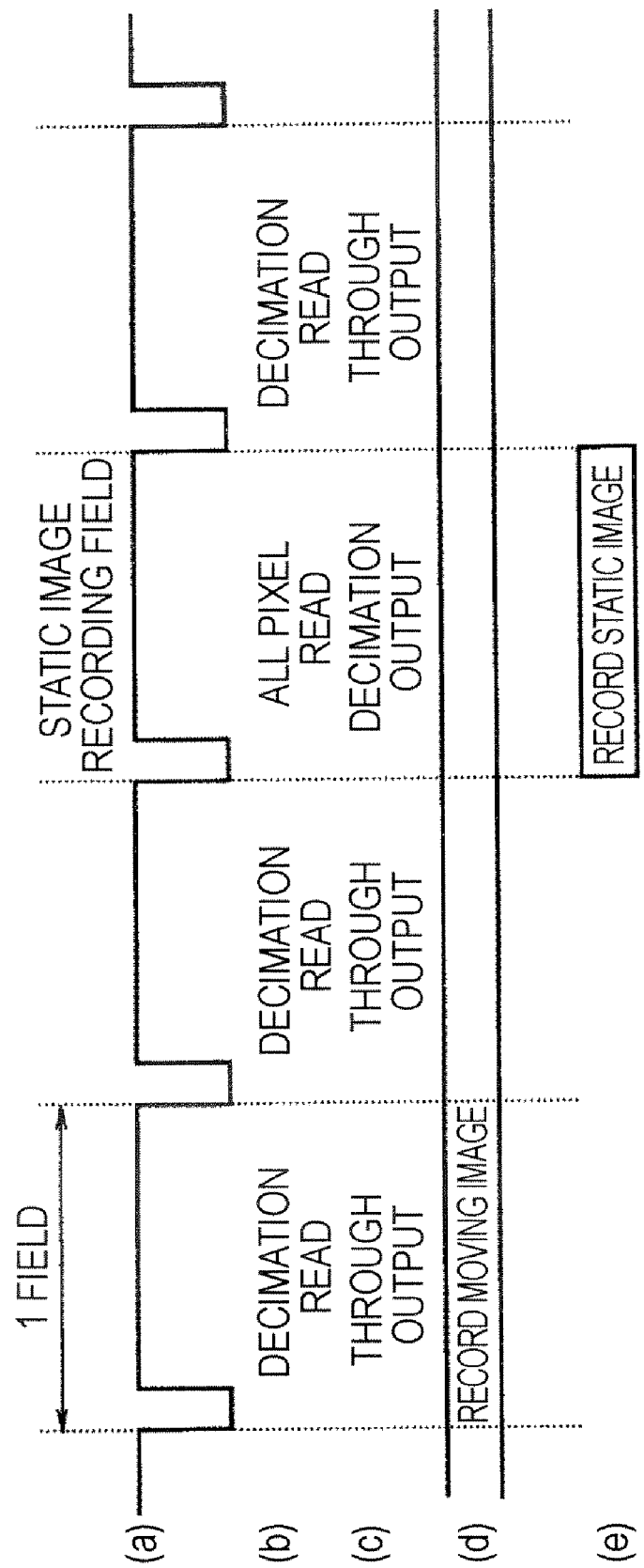
FIG. 9 includes illustrations showing the outline of the recording process.

FIG. 9 illustrates the above-described recording process. Part (a) of FIG. 9 illustrates a field synchronizing signal, part (b) of FIG. 9 illustrates a pixel reading system, and part (c) of FIG. 9 illustrates a decimation operation. Part (d) of FIG. 9 illustrates recording of a moving image, and part (e) of FIG. 9 illustrates recording of a static image. That is, when the recording process starts, in pixel reading of the imaging device 12, decimation is performed in the moving image capturing state not in the static image capturing state, as shown in part (b) of FIG. 9. In addition, as shown in part (c) of FIG. 9, the eliminating section 14 performs decimation only in the static image capturing state. As a result, as shown in part (d) of FIG. 9, capturing of a moving image is continued without interruption until the termination of recording. In contrast, capturing of a static image is performed only in the static image capturing state, as shown in part (e) of FIG. 9.

Since a static image to be recorded is not subjected to decimation, a reduction in image quality can be suppressed. In addition, since the imaging device 12 performs decimation in a state other than the static image capturing state, power consumption of the imaging device 12 can be reduced compared with a case where all the pixels are read.

The foregoing series of processing may be performed by hardware or software.

In this specification, steps performed on the basis of a program are not necessarily performed in chronological order in accordance with the written order. The steps may be performed in parallel or independently without being performed in chronological order.

The embodiments of the present invention are not limited to the above-described embodiments. Various changes can be made to the present invention without departing from the scope and spirit of the present invention.

It should be understood by those skilled in the art that various modifications, combinations, sub-combinations and alterations may occur depending on design requirements and other factors insofar as they are within the scope of the appended claims or the equivalents thereof.

What is claimed is:

1. An imaging apparatus that captures and records a moving image and a static image at the same time, comprising:
   capturing means for capturing an optical image of a subject in a decimation mode and outputting to a subsequent stage a first pixel signal while recording of the moving image is performed but recording of the static image is not performed, and for capturing the optical image of the subject in a non-decimation mode and outputting to the subsequent stage a second pixel signal while recording of both the moving image and the static image is performed;
   splitting means for splitting the second pixel signal output from the capturing means into a first split pixel signal and a second split pixel signal, the first split pixel signal and the second split pixel signal each being an identical copy of the second pixel signal;
   eliminating means for performing decimation on the first split pixel signal output from the splitting means only while both recording of the moving image and the static image are performed;
   moving image data generating means for generating moving image data based on the first pixel signal output by the capturing means while only recording of the moving image is performed and based on the first split pixel signal output by the eliminating means while both recording of the moving image and the static image are performed;
   static image data generating means for generating static image data based on the second split pixel signal output from the splitting means; and
   recording means for recording the generated moving image data and the generated static image data.

2. The imaging apparatus according to claim 1, wherein the capturing means includes a complementary metal-oxide semiconductor sensor.

3. An imaging method for use in an imaging apparatus that captures and records a moving image and a static image at the same time, comprising the steps of:
   while recording of the moving image is performed but recording of the static image is not performed,
      capturing, using an imaging device, an optical image of a subject in a decimation mode and outputting to a subsequent stage a first pixel signal;
      generating moving image data based on the first pixel signal; and
      recording the generated moving image data, and while recording of both the moving image and the static image is performed,
      capturing, using the imaging device, an optical image of the subject in a non-decimation mode and outputting to the subsequent stage a second pixel signal;
      splitting the second pixel signal into a first split pixel signal and a second split pixel signal, the first split pixel signal and the second split pixel signal each being an identical copy of the second pixel signal;
      generating static image data based on the first split pixel signal;
      recording the generated static image data;
      performing decimation on the second split pixel signal;
      generating moving image data based on the second split pixel signal that has been subjected to decimation; and
      recording the generated moving image data.

4. A non-transitory computer readable storage medium having stored thereon a program for capturing and recording a moving image and a static image at the same time and for causing a computer to perform processing comprising the steps of:
   while recording of the moving image is performed but recording of the static image is not performed,
      capturing an optical image of a subject in a decimation mode and outputting to a subsequent stage a first pixel signal;
      generating moving image data based on the first pixel signal; and
      recording the generated moving image data, and while recording of both the moving image and the static image is performed,
      capturing an optical image of a subject in a non-decimation mode and outputting to the subsequent stage a second pixel signal;
      splitting the second pixel signal into a first split pixel signal and a second split pixel signal, the first split pixel signal and the second split pixel signal each being an identical copy of the second pixel signal;
      generating static image data based on the first split pixel signal;
      recording the generated static image data;
      performing decimation on the second split pixel signal;
      generating moving image data based on the second split pixel signal that has been subjected to decimation; and
      recording the generated moving image data.

5. An imaging apparatus that captures and records a moving image and a static image at the same time, the imaging apparatus comprising:

an imaging device configured to capture an optical image of a subject in a decimation mode and to output to a subsequent stage a first pixel signal while recording of the moving image is performed but recording of the static image is not performed, and configured to capture the optical image of the subject in a non-decimation mode and to output to the subsequent stage a second pixel signal while recording of both the moving image and the static image are performed;

a splitting section configured to split the second pixel signal output from the imaging device into a first split pixel signal and a second split pixel signal, the first split pixel signal and the second split pixel signal each being an identical copy of the second pixel signal;

an eliminating section configured to perform decimation on the first split pixel signal output from the splitting section only while recording of both the moving image and the static image are performed;

a moving image data generator configured to generate moving image data based on the first pixel signal captured in a decimation mode by the imaging device while only recording of the moving image is performed and based on the first split pixel signal that has been subjected to decimation by the eliminating section while both recording of the moving image and the static image are performed;

a static image data generator configured to generate static image data based on the second split pixel signal output from the splitting section; and a recorder configured to record the generated moving image data and the generated static image data.

* * * * *